(12) United States Patent
Gupta et al.

(10) Patent No.: US 7,739,251 B2
(45) Date of Patent: Jun. 15, 2010

(54) INCREMENTAL MAINTENANCE OF AN XML INDEX ON BINARY XML DATA

(75) Inventors: Nitin Gupta, Sunnyvale, CA (US); Sivasankaran Chandrasekar, Palo Alto, CA (US); Sam Idicula, San Jose, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 416 days.

(21) Appl. No.: 11/715,603

(22) Filed: Mar. 7, 2007

(65) Prior Publication Data

US 2008/0098020 A1 Apr. 24, 2008

Related U.S. Application Data

(63) Continuation-in-part of application No. 11/707,730, filed on Feb. 16, 2007.

(60) Provisional application No. 60/853,236, filed on Oct. 20, 2006.

(51) Int. Cl.
*G06F 17/00* (2006.01)
(52) U.S. Cl. .................. 707/696; 711/200; 711/219
(58) Field of Classification Search .................. None
See application file for complete search history.

(56) References Cited

U.S. PATENT DOCUMENTS

| 5,643,633 | A | 7/1997 | Telford et al. |
| 5,745,904 | A | 4/1998 | King |
| 5,870,590 | A | 2/1999 | Kita et al. |
| 6,018,747 | A | 1/2000 | Burns et al. |
| 6,330,573 | B1 | 12/2001 | Salisbury et al. |
| 6,414,610 | B1 | 7/2002 | Smith |
| 6,427,123 | B1 | 7/2002 | Sedlar |
| 6,519,597 | B1 | 2/2003 | Cheng et al. |

(Continued)

FOREIGN PATENT DOCUMENTS

WO  WO 03107576  12/2003

(Continued)

OTHER PUBLICATIONS

Girardot et al., "Millau: an encoding format for efficient representation and exchange of XML over the Web", IBM Almaden Research Center, 24 pages.

(Continued)

*Primary Examiner*—Apu M Mofiz
*Assistant Examiner*—Anteneh Girma
(74) *Attorney, Agent, or Firm*—Hickman Palermo Truong & Becker LLP; Adam C. Stone

(57) ABSTRACT

Techniques are provided for incrementally maintaining an XML index built to access XML data that is encoded in binary XML form. Rather than delete and reinsert index entries of all the nodes of a modified XML document, only the index entries of the affected nodes are modified. Consequently, the order key values stored in the index may become inconsistent with the current hierarchical locations of the nodes to which the order key values correspond. Techniques are described for resolving the inconsistencies, and for addressing additional problems that result when the XML index is path-subsetted.

42 Claims, 2 Drawing Sheets

U.S. PATENT DOCUMENTS

| | | | |
|---|---|---|---|
| 6,523,062 | B1 | 2/2003 | Bridgman et al. |
| 6,598,055 | B1 | 7/2003 | Keesey et al. |
| 6,697,805 | B1 | 2/2004 | Choquier et al. |
| 6,883,137 | B1 | 4/2005 | Girardot et al. |
| 7,013,425 | B2 | 3/2006 | Kataoka |
| 7,031,956 | B1 | 4/2006 | Lee et al. |
| 7,080,094 | B2 | 7/2006 | Dapp et al. |
| 7,089,567 | B2 | 8/2006 | Girardot et al. |
| 7,139,746 | B2 | 11/2006 | Shin et al. |
| 7,143,397 | B2 | 11/2006 | Imaura |
| 7,162,485 | B2 | 1/2007 | Gottlob et al. |
| 7,171,404 | B2 | 1/2007 | Lindblad et al. |
| 7,171,407 | B2 | 1/2007 | Barton et al. |
| 7,216,127 | B2 | 5/2007 | Auerbach |
| 2001/0049675 | A1 | 12/2001 | Mandler et al. |
| 2002/0152267 | A1 | 10/2002 | Lennon |
| 2002/0188613 | A1 | 12/2002 | Chakraborty et al. |
| 2003/0093626 | A1 | 5/2003 | Fister |
| 2003/0131051 | A1 | 7/2003 | Lection et al. |
| 2003/0177341 | A1 | 9/2003 | Devillers |
| 2003/0212664 | A1 | 11/2003 | Breining et al. |
| 2004/0010752 | A1 | 1/2004 | Chan et al. |
| 2004/0044659 | A1 | 3/2004 | Judd et al. |
| 2004/0143791 | A1 | 7/2004 | Ito et al. |
| 2004/0148278 | A1 | 7/2004 | Milo et al. |
| 2004/0167864 | A1 | 8/2004 | Wang et al. |
| 2004/0205551 | A1 | 10/2004 | Santos |
| 2004/0267760 | A1 | 12/2004 | Brundage et al. |
| 2005/0033733 | A1 | 2/2005 | Shadmon et al. |
| 2005/0038688 | A1 | 2/2005 | Collins et al. |
| 2005/0050016 | A1 | 3/2005 | Stanoi et al. |
| 2005/0050054 | A1 | 3/2005 | Clark et al. |
| 2005/0091188 | A1* | 4/2005 | Pal et al. ................. 707/1 |
| 2005/0120031 | A1 | 6/2005 | Ishii |
| 2005/0228791 | A1* | 10/2005 | Thusoo et al. ............. 707/6 |
| 2005/0228792 | A1 | 10/2005 | Chandrasekaran et al. |
| 2005/0229158 | A1 | 10/2005 | Thusoo et al. |
| 2005/0257201 | A1 | 11/2005 | Rose et al. |
| 2005/0278289 | A1 | 12/2005 | Gauweiler et al. |
| 2005/0278616 | A1 | 12/2005 | Eller |
| 2005/0289125 | A1 | 12/2005 | Liu et al. |
| 2006/0021246 | A1 | 2/2006 | Schulze et al. |
| 2006/0277179 | A1 | 12/2006 | Bailey |
| 2007/0005632 | A1* | 1/2007 | Stefani et al. ............ 707/102 |
| 2007/0271305 | A1 | 11/2007 | Chandrasekar et al. |
| 2008/0098001 | A1 | 4/2008 | Gupta et al. |
| 2008/0098019 | A1 | 4/2008 | Sthanikam et al. |

FOREIGN PATENT DOCUMENTS

| | | |
|---|---|---|
| WO | WO 2006026534 | 3/2006 |

OTHER PUBLICATIONS

Shankar Pal et al., "Indexing XML Data Stored in a Relational Database", Proceedings of the 30th VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

"EE XML/Binary CFI File Handling Library User Manual" downloaded from the Internet <http://www.smos.esa.int/BinaryXML/SO-UM-DME-LIPP-0005-BINXML-FH-SUM-E2-RO.pdf> 49 pages.

"Binary XML Library" downloaded from the Internet Aug. 6, 2007 <http://www.smos.esa.int/BinaryXML/> 2 pages.

"Zapthink" downloaded from the Internet Aug. 6, 2007 <http://www.zapthink.com/report.html?id=ZAPFLASH-11162004> 3 pages.

Bayardo et al., "An Evaluation of Binary XML Encoding Optimizations for Fast Stream Based XML Processing" *WWW2004* 10 pages.

Bruce, "CubeWerx Position Paper for Binary XML Encoding" (10 pages).

Martin et al., "WAP Binary XML Content Format" downloaded from the Internet Aug. 6, 2007 < http://www.w3.org/TR/wbxml/ > 15 pages.

Bayardo et al., "Optimizing encoding: An evaluation of binary xml encoding optimizations for fast stream based xml processing", May 2004, Proceedings of the 13th international conference on World Wide Web WWW 04', Publisher ACM press, 7 pages.

Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.

Zou et al., "XML Processing: Ctree: a compact tree for indexing XML data" Nov. 2004, Proceedings of the 6th annual international workshop on Web information and data management WIDM 04', Published by ACM Press, 10 pages.

PCT/US2007/010163, Notification of Transmittal of the International Search Report and the Written Opinion of the International Searching Authority, Oct. 12, 2007, 12 pages.

* cited by examiner

INCREMENTAL MAINTENANCE OF AN XML INDEX ON BINARY XML DATA

RELATED APPLICATIONS

This application is related to and claims the benefit of priority from provisional Application No. 60/853,236 filed Oct. 20, 2006, entitled "HANDLING BINARY XML"; the entire content of which is incorporated by this reference for all purposes as if fully disclosed herein.

This application is a continuation-in-part of U.S. patent application Ser. No. 11/707,730, entitled "ENCODING INSIGNIFICANT WHITESPACE OF XML DATA", filed on Feb. 16, 2007, the entire content of which is incorporated by this reference for all purposes as if fully disclosed herein.

This application is also related to the following applications, the content of which is incorporated by this reference for all purposes as if fully disclosed herein:

U.S. patent application Ser. No. 11/182,997, filed Jul. 14, 2005, entitled "ENCODING OF HIERARCHICALLY ORGANIZED DATA FOR EFFICIENT STORAGE AND PROCESSING" (hereinafter the "Binary XML Application");

U.S. patent application Ser. No. 10/884,311, filed Jul. 2, 2004, entitled "Index For Accessing XML Data" (hereinafter the "XML Index Application");

U.S. patent application Ser. No. 11/437,512, filed May 18, 2006, entitled "EFFICIENT PIECE-WISE UPDATES OF BINARY ENCODED XML DATA" (hereinafter the "Piece-wise Update Application"); and U.S. patent application Ser. No. 11/401,613, filed Apr. 10, 2006, entitled "A MECHANISM FOR IMPROVING PERFORMANCE ON XML OVER XML DATA USING PATH SUBSETTING" (hereinafter the "Subsetting Application").

FIELD OF THE INVENTION

The present invention is related to XML and, more specifically, to the incremental maintenance of XML indexes.

BACKGROUND

XML Indexes

The XML Index Application, referenced above, describes an XML index, which may be used as a mechanism for indexing paths, values, and order information in XML documents. In the embodiment described in the XML Index Application, a logical XML index includes a PATH table, and a set of secondary indexes. Each Indexed XML document contains many indexed nodes. The PATH table contains one row per indexed node. For each indexed node, the PATH table row for the node contains:

- a PATHID that indicates the path to the node,
- "location data" for locating the fragment data for the node within the base structures, and
- "Order Key" that indicates the position of the node within the structural hierarchy of the XML document that contains the node.

Optionally, the PATH table may also contain value information for those nodes associated with values.

Order Keys

The Order Key of a node is created by appending a value to the Order Key of the node's immediate parent. The appended value indicates the position, among the children of the parent node, of that particular child node.

For example, assume that a particular node D is the child of a node C, which itself is a child of a node B that is a child of a node A. Assume further that node D has the Order key 1.2.4.3. The final "3" in the Order Key indicates that the node D is the third child of its parent node C. Similarly, the 4 indicates that node C is the fourth child of node B and the 2 indicates, that Node B is the second child of node A. The leading 1 indicates that node A is the root node (i.e. has no parent).

The XML Index Application explains that the XML index may store the order key values in an ORDER_KEY column. For any given row, the ORDER_KEY column stores a Dewey order key for the node that corresponds to that row. For example, the Dewey order key of 1.3.21.5 would indicate that the node is the $5^{th}$ child of $21^{st}$ child of $3^{rd}$ child of the root.

Piece-Wise Maintenance to Binary XML

The Binary XML Application, referenced above, describes a binary encoding form for XML data, which provides compression, improved query performance, and efficient partial update support. The Piece-wise Update Application, referenced above, describes techniques for applying requested modifications only to those portions of persistently stored binary XML that correspond to the nodes that are being modified. By performing piece-wise updates, the need to read, decode, update, encode and store the binary representation of entire XML documents, for every modification, is avoided.

Operations that may result in modifications to the nodes of an XML document, such as insert, update, and delete operations, are generally referred to as Data Manipulation Language ("DML") operations. A DML operation may result, for example, by executing a statement such as: updateXML(value(t), /a/b2, . . . <b2>newdata</b2>).

As explained in the Piece-wise Update Application, the steps involved in a piece-wise DML operation generally include:

(1) Node identification: identifying the set of nodes to be updated. In the example statement, node identification involves identifying all nodes that match the path /a/b2. To identify the nodes, the XML index may be used to locate index entries for all nodes that match the path /a/b2. The XML index entries for the identified nodes include location data (locators) for locating and reconstructing the actual data for the nodes. Such locators may contain, for example, an offset of the node's data within the binary XML storage of the XML document, and any contextual information needed to decode the data for the node.

(2) Applying the byte-level changes to the encoded data for each node identified above.

(3) Updating the XML index to reflect the changes.

The node identification step may use the XML index, might be done using streaming evaluation techniques, or might involve a hybrid approach in which a part of the input path is identified using the XML Index and the remainder of the path is identified using a streaming evaluation approach.

Order Key Problems Caused by Piece-Wise Maintenance

Unfortunately, deleting rows from the PATH table for nodes that have been deleted/updated and adding new rows for newly inserted nodes may not always be enough. Specifically, when the operations result in the addition or deletion of nodes of an XML document, the order-key values within the XML index for some of the nodes that where not directly involved in the DML operation may cease to be accurate.

For example, consider the following XML document (D1):

```
<root>
  <a>
    <b1>
    </b1>
    <b2>
    </b2>
    <b3>
    </b3>
  </a>
</root>
```

Before a DML operation, the XML index entry for node b3 would have the order key 1.1.3, indicating that b3 is the third child of the first child of the root. Assume that the DML operation deletes b2. After the DML operation, the XML data would be structured as follows (D1'):

```
<root>
  <a>
    <b1>
    </b1>
    <b3>
    </b3>
  </a>
</root>
```

In D1', b3 is the second child of the first child of the root. Therefore, the 1.1.3 order key in the index entry of b3 would no longer accurately reflect the exact hierarchical position of b3 within D1'.

Similar to node deletions, the addition of new nodes to an XML document may affect the accuracy of some of the order key values in the XML index. For example, if the DML operation adds a new node <c> between the <b2> and <b3>, the resulting XML data would be structured as follows (D1"):

```
<root>
  <a>
    <b1>
    </b1>
    <b2>
    </b2>
    <c>
    </c>
    <b3>
    </b3>
  </a>
</root>
```

In D1", b3 is the fourth child of the first child of the root. Therefore, the 1.1.3 order key in the index entry of b3 would no longer accurately reflect the exact hierarchical position of b3 within D1".

To be useful, an XML index must be maintained in response to DML operations on the base XML documents that are indexed by the XML index. However, as illustrated by the preceding examples, DML operations on some nodes render inaccurate the information (such as the order key values) in the index entries for other nodes. Therefore, to ensure that the XML index remains accurate, the index maintenance that is performed as a result of a DML operation usually involves deleting all of the indexing information corresponding to all nodes of any document that is changed in the DML operation, and adding an entire new set of indexing information for the newly changed documents.

For example, in response to the deletion of <b2>, the index entries for all of the nodes of D1 would be deleted, and then new index entries for all of the nodes of D1' would be added. Similarly, in response to the addition of <c>, the index entries for all of the nodes of D1 would be deleted, and then new index entries for all of the nodes of D1" would be added. Maintaining indexes in this manner is inefficient and can slow performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
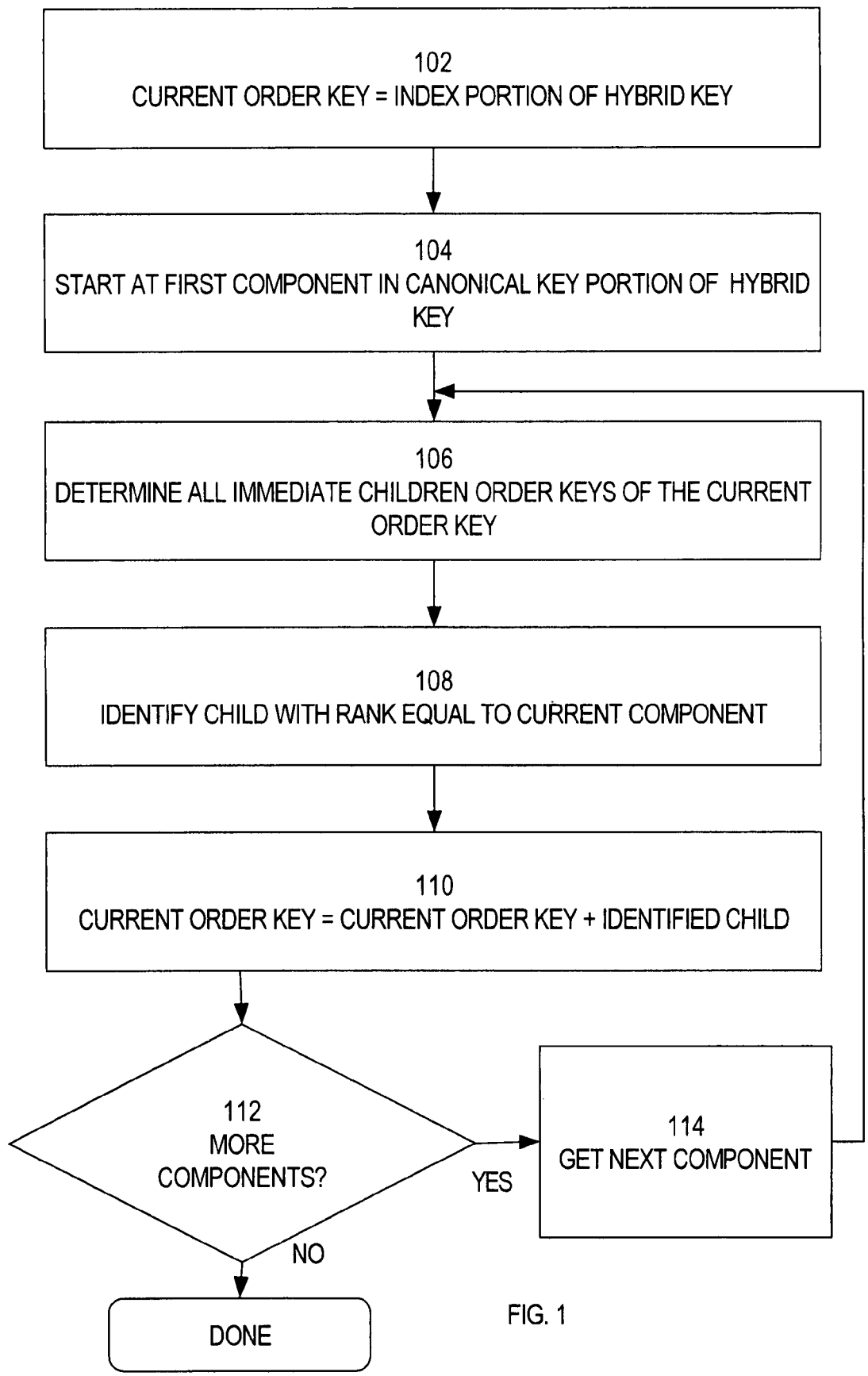
FIG. 1 is a flowchart illustrating steps for converting a hybrid key into an index order key, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for incrementally maintaining an XML index used to access XML data that is encoded in binary XML form. Rather than delete and reinsert index entries of all the nodes of a modified XML document, only the index entries of the affected nodes are modified. Only modifying the index entries of the affected nodes significantly reduces the overhead of maintaining the index. However, a consequence of only modifying the index entries of the affected nodes is that the order key values stored in the index for other nodes may become inconsistent with the current hierarchical locations of those nodes. Techniques are described hereafter for resolving the inconsistencies, and for addressing additional problems that result when the XML index is path-subsetted.

Index Order Keys and Canonical Order Keys

As used herein, "canonical order keys" refers to order key values that accurately reflect the current position of nodes within the structural hierarchy of an XML document. Thus, in D1, the canonical order key value for b3 is 1.1.3. In D1', the canonical order key value for b3 is 1.1.2. In D1", the canonical order key value for b3 is 1.1.4.

In contrast, "index order keys" refers to the order key values that are currently stored in the XML index. Initially, the index order key value for a node will typically be the canonical order key value. However, as changes are made to the underlying XML data, the canonical order key value for a node may change. If the index entry for the node does not change, then the index order key value for the node will cease to be the same as the canonical order key value for the node.

For example, the index order key value of b3 may initially be 1.1.3. If b2 is deleted to create D1', then the canonical order key value for b3 will change to 1.1.2. However, if the index entry for b3 is not deleted or modified, then the index order key value for b3 will continue to be 1.1.3.

Similarly, if <c> is added to D1 to create D1", then the canonical order key value for b3 will change from 1.1.3 to 1.1.4. However, if the index entry for b3 is not modified or deleted, then the index order key value for b3 will continue to be 1.1.3. Further, the addition of c to D1 will result in the creation of index information for c. While the canonical order key for <c> is 1.1.3, it would be inappropriate for the index order key of <c> to be 1.1.3 because that would duplicate the index order key of b3. Therefore, a fractional order key may be assigned to the newly inserted node <c>. For example, <c> may be assigned the order key 1.1.(25) to indicate that <c> is after <b2> that has the index order key 1.1.2, and before <b3> that has the index order key 1.1.3.

After many updates (node additions and deletions) to an XML document, many nodes of the document may have index order key values that differ from their canonical order key values.

Hybrid Keys

A hybrid key is an order key value that may include both an index key portion and a canonical key portion. Typically, the index key portion of a hybrid key will precede the canonical key portion. For a hybrid key, the index key portion and the canonical key portion are usually generated using different techniques. For example, the portion of an order key that is returned by an index will always be index-valued. On the other hand, the portion of an order key that is generated using streaming evaluation will always be canonical. Streaming evaluation is described in Yanlei Diao, Peter Fischer, Michael Franklin, and Raymond To. YFilter: Efficient and Scalable Filtering of XML Documents. Demo paper, in *Proceedings of ICDE* 2002, February 2002, the contents of which are incorporated herein by this reference.

Combining different order key generation techniques to generate an order key for a node specified by an XPath may result in the generation of a hybrid key. For example, to find the order key for a particular node \a\b\c\d, the index may be used to find the index order key for \a\b. The index order key for \a\b will be the first two components of the four component order key of \a\b\c\d. Then, streaming evaluation may be used to find the remaining two order key components for \a\b\c\d. The resulting order key will be a hybrid order key, where the first two components are the index key portion and the second two components are the canonical key portion.

The length of the index key portion of any order key value is referred to as the "index depth" of the order key value. Thus, if the index depth of a hybrid key is zero, then the hybrid key is the same as a canonical order key. In contrast, if the index depth of a hybrid key is the same as the length of the hybrid key, then the hybrid key is the same as an index order key.

Generation of Hybrid Order Keys

As mentioned above, performing a piece-wise maintenance DML operation on Binary XML involves a node identification step during which the nodes that are affected by the DML operation are identified. According to one embodiment, during the node identification step, a hybrid order key value is computed for each node thus identified.

Specifically, during the node identification step, order keys are generated for the affected nodes. The manner in which the order the order keys are generated is selected by a cost-based optimizer, based on a cost estimate for using each technique. Thus, for some queries, the cost-based optimizer may dictate that order keys are generated using the XML index exclusively. For other queries, the cost-based optimizer may dictate that order keys are generated using streaming evaluation exclusively.

For yet other queries, the cost-based optimizer may dictate that the XML Index is used to determine the order key components for a part of the Path to be identified, and the order key components for the remaining part may be identified using a Streaming Xpath evaluation Engine over the Binary XML decoder. The Binary XML decoder can start decoding XML data starting from arbitrary offsets representing the beginning of a node in the binary stream. The Binary XML decoder supports canonical order key tracking, and at any point of time keeps track of the Order Key of the current node that is being decoded.

Thus, at the end of the node identification step, hybrid index keys will have been generated for each of the nodes affected by the DML operation. The hybrid keys may be entirely canonical, entirely index-based, or may have both canonical and index-based portions.

As shall be described hereafter, these hybrid index keys are used to perform piece-wise maintenance of the XML index. Specifically, techniques are described hereafter for converting the Hybrid Order Keys that are generated during the node identification step of a piece-wise maintenance DML operation into index order keys. The index order keys may then be used to identify the rows, within the Path table of the XML index, of the nodes that were affected by the DML operation. Having identified the appropriate rows within the Path table, piece-wise maintenance of the XML index may be performed.

Converting Hybrid Keys to Index Order Keys

Referring to FIG. 1, it is a flowchart illustrating steps for converting Hybrid Order Keys to Index Order Keys by querying the Path table of the XML index. For the purpose of Illustration, an example shall be given in which the hybrid key is 1.1.3, has an index depth of 1, and has been generated for node <c> in D1":

```
<root>
 <a>
  <b1>
  </b1>
  <b2>
  </b2>
  <c>
  </c>
  <b3>
```

```
       </b3>
     </a>
   </root>
```

The canonical order keys for the nodes of D1" are as follows:

| node | canonical order key |
|------|---------------------|
| root | 1                   |
| a    | 1.1                 |
| b1   | 1.1.1               |
| b2   | 1.1.2               |
| c    | 1.1.3               |
| b3   | 1.1.4               |

For the purpose of explanation, it shall be assumed that the index order keys for the nodes of D1" are:

| node | index order key |
|------|-----------------|
| root | 1               |
| a    | 1.1             |
| b1   | 1.1.1           |
| b2   | 1.1.2           |
| c    | 1.1.(25)        |
| b3   | 1.1.3           |

Turning again to FIG. 1, at step 102, the "current order key" (initially null) is set equal to the index portion of the Hybrid Key. In the present example, the index depth of the hybrid key is 1. Therefore, at step 102, the current order key is set to the first component of the hybrid key 1.1.3. Thus, after step 102, the current order key will simply be "1".

At step 104, processing is set to begin at the first component of the canonical key portion of the hybrid key. Thus, the first component of the canonical key becomes the "current component". In the present example, the canonical portion of the hybrid key is 1.3. Therefore, at step 104, the "1" component of the canonical portion 1.3 is established as the current component.

Steps 106 to 114 form a loop that is repeated for each component of the canonical portion of the hybrid key. As the loop is repeated, each component of the canonical portion of the hybrid key is established, in order, as the current component. Thus, during the first iteration, the first component of the canonical portion of the hybrid key is the current component. During the second iteration, the second component of the canonical portion of the hybrid key is the current component. The loop is repeated until all components of the canonical portion of the hybrid key have been processed.

Specifically, during the first iteration of the loop, at step 106, the XML index is used to identify the index order keys of all immediate children of the node associated with current order key. At this point, the current order key is 1, which is the order key of the root node. Thus, the XML index is used to identify the order keys of all immediate children of the root node. In the present example, the root node only has one immediate child: node <a>. The index order key for node <a> is 1.1, the last component of which is "1".

To improve performance of step 106, the XML index may include a descendant index that is built on order key values from the Path table. Specifically, step 106 may involve traversing the descendant index to find all descendant index entries associated with order keys that have prefixes that match the current order key. Descendant indexes are described in greater detail hereafter.

At step 108, the child with a rank equal to the current component is identified. The current component is "1", and node <a>, being the only child of the root node, has the rank of one. Therefore, node <a> is identified during the first iteration of step 108

At step 110, the last component of the index order key of the node identified in step 108 is added to the current order key. In the present example, node <a> is the identified node, and the last component in the index order key of node <a> is 1. Therefore, "1" is added to the current order key, resulting in a current order key of "1.1".

At step 112, a determination is made whether all components of the canonical portion of the hybrid key have been processed. In the present example, the last component of the hybrid key 1.1.3 has not yet been processed. Therefore, control passes to step 114.

At step 114, the next component in the canonical portion of the hybrid key is established as the current component. In the present example, the next component in the canonical portion of the hybrid key is "3". Therefore, "3" is established as the current component. Control then passes back to step 106, for the second iteration of the loop.

During the second iteration of the loop, at step 106, the Path table is queried to identify the index order keys of all immediate children of the node associated with current order key. At this point, the current order key is 1.1, which is the order key of the node <a>. Thus, the Path table is used to identify the order keys of all immediate children of node <a>. In the present example, node <a> has four children b1, b2, c and b3. The index order keys for these children are respectively 1.1.1, 1.1.2, 1.1.(25), and 1.1.3.

At step 108, the child with a rank equal to the current component is identified. The current component is "3", and node <c> is the third-ranked child of <a>. Therefore, node <c> is identified during the second iteration of step 108.

At step 110, the last component of the index order key of the node identified in step 108 is added to the current order key. In the present example, node <c> is the identified node, and the last component in the index order key of node <c> is (25). Therefore, "(25)" is added to the current order key, resulting in a current order key of "1.1.(25)".

Figure 2:
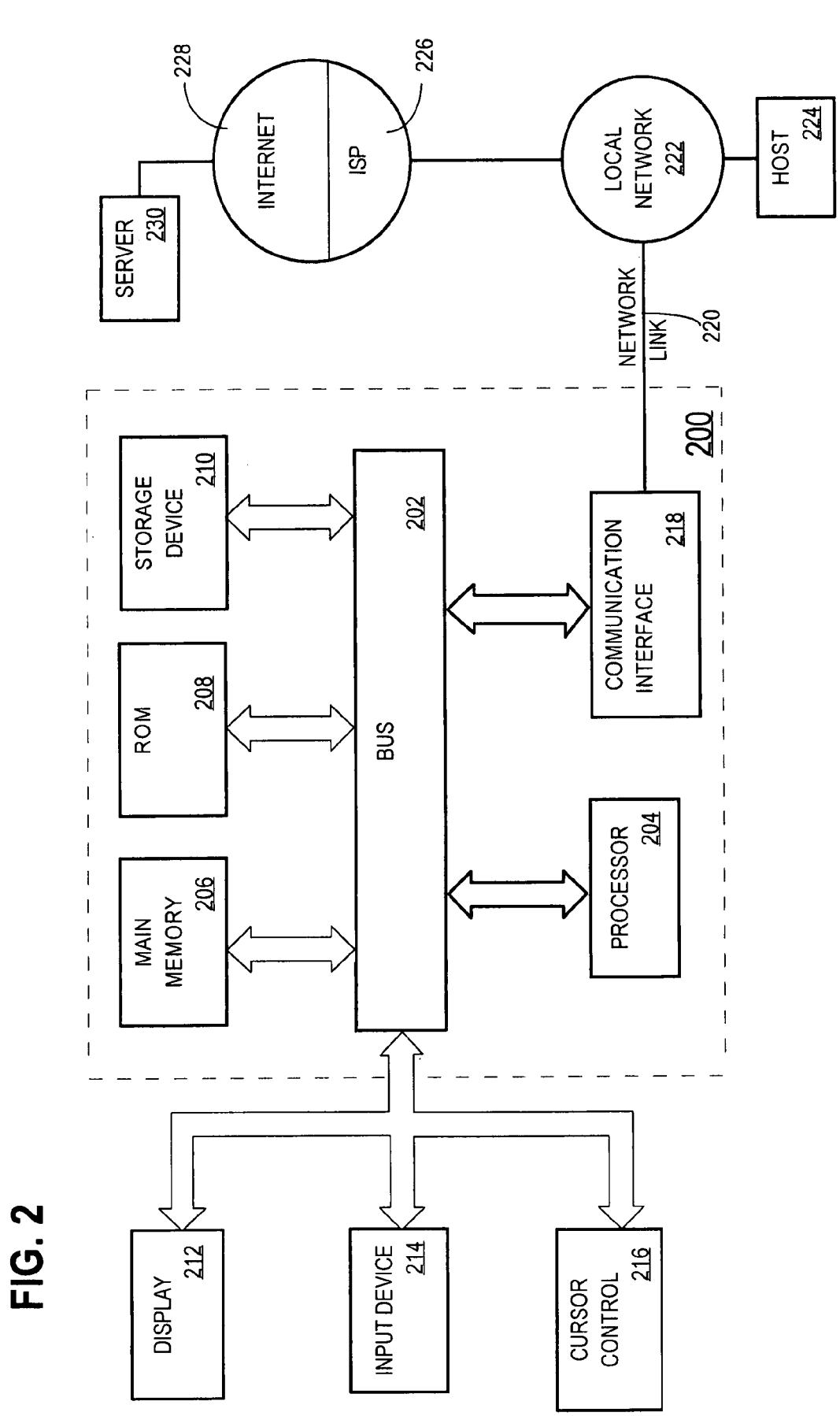
FIG. 2 is a block diagram of a computer system upon which embodiments of the invention may be implemented.

At step 112, a determination is made whether all components of the canonical portion of the hybrid key have been processed. In the present example, the last component of the hybrid key 1.1.3 has been processed. Therefore, the conversion process is done, having produced the current order key of 1.1.(25). The current order key produced by the conversion process illustrated in FIG. 2 is the index order key that corresponds to the hybrid key.

XML Index Maintenance for DML Operations

During a DML operation, the hybrid order keys of the nodes affected by the DML operation may be used, indirectly, to locate the index entries, within the path table, of the affected nodes. The hybrid keys cannot be used directly to locate the index entries for the affected nodes because the index entries of the affected nodes contain index order key values that may not accurately match hybrid keys that contain canonical key portions.

DML operations include operations that insert, update, and delete XML nodes in XML documents. To update the XML index in response to an operation that deletes a node, the Hybrid Order Keys of the root node of the XML fragment that needs to be deleted is identified during Node identification. This key is then converted into the index order key using the conversion technique described above. Then, all the rows in the path table with this Order Key, and all its descendant nodes, are deleted. As shall be described in greater detail hereafter, deletion of descendant nodes is made more efficient by creating a descendant index on the Order Key Column.

With respect to DML operations that insert a node, the technique for determining the Order Key for a newly inserted fragment is based on the semantics of the piece-wise update routine that caused the addition of the node. For example, for the appendChildXML( ) operator, the new fragment needs to be appended at the end of the parent node. For such operations, the Order key of the parent of the node that needs to inserted is first determined. If the Order key that is determined for the parent node is a hybrid order key, then the hybrid order key is converted to an index order key. Once the index order key of the parent node is obtained, the appropriate component value for the child is appended to the index order key of the parent node. For example, for the appendChildXML( ) operator, the order key is obtained by incrementing the Index Order Key of the last already-existing child node of the parent node by 1.

If the DML operation inserts a node between two existing nodes, then the orderkey for the new node may be generated by dividing by 2 the sum of the index order key values of the sibling nodes between which the new node is to be inserted. For example, if the new node is to be inserted between a node that has an index order key of 1.3.5.3 and a node that has an index order key of 1.3.5.4, the index order key for the new node may be 1.3.5.(25). After obtaining the Order Key of the parent node, the Order Key of a child node is obtained by appending its position, within the parent, to the parent Order Key.

With respect to DML operations that update nodes, the values corresponding to the new node are inserted in the XML index as done for the Insert case, and the values corresponding to the Old Node are deleted, as done for Delete case. Thus, an update is treated as a deletion followed by an insertion.

For example, a user may desire to modify D1" by changing the value of c to d. Such a modification may be accomplished by the statement: updateXML(value(t), /a/c, "<d>"). As part of the update operation, the order key for the path /a/c is generated. If streaming evaluation is used to generate the entire order key for /a/c, the resulting order key will be 1.1.3 with index depth 0. The appropriate rows of the Path Table cannot be located using 1.1.3, because the path table entry for /a/c contains the index order key value of 1.1.(25).

The conversion techniques described above are therefore used to convert the hybrid key 1.1.3 (which in this case is entirely canonical) to an index order key. In the present example, the hybrid key 1.1.3 of /a/c would be converted to the index order key of 1.1.(25). Once the index order key of 1.1.(25) is determined, the index order key is used to locate and delete the path table entries for /a/c, and for all nodes that descend from /a/c. These deletions may be performed by issuing one or more SQL queries against the Path Table. In the present example, a SQL query could be executed to delete all path table rows that include order key values of which "1.1.(25)" is the prefix. The queries that are executed against the path table to perform the incremental maintenance of the XML index are referred to herein as the "index-maintenance queries".

Once the path table rows that include the order key values that have a prefix of 1.1.(25) are deleted, another set of one or more index-maintenance queries are executed to add to the Path table an entry for the new node <d>.

The Descendant Index

The performance of the index-maintenance queries may be significantly increased using a descendant index (referred to in the XML Index Application as an "ORDERKEY_INDEX"). The Descendant Index is built on the rid and orderkey columns of the PATH table. Thus, entries in the Descendant Index are in the form (keyvalue, rowid), where keyvalue is a composite value representing a particular rid/orderkey combination, and rowid identifies a particular row of the PATH table.

When (1) the base table row and (2) the orderkey of a node are known, the Descendant Index may be used to quickly locate the row, within the PATH table, for the node. For example, based on the key value "R1.'1.2'", the Descendant Index may be transversed to find the entry that is associated with the key value "R1.'1.2'". Assuming that the able is populated as follows:

POPULATED PATH TABLE

| rowid | Pathid | Rid | OrderKey | Locator | Value |
|---|---|---|---|---|---|
| 1 | 1 | R1 | 1 | | |
| 2 | 2 | R1 | 1.1 | | SBELL-2002100912333601PDT |
| 3 | 3 | R1 | 1.2 | | |
| 4 | 4 | R1 | 1.2.1 | | |
| 5 | 5 | R1 | 1.2.1.1 | | SVOLLMAN |
| 6 | 1 | R2 | 1 | | |
| 7 | 2 | R2 | 1.1 | | ABEL-20021127121040897PST |
| 8 | 3 | R2 | 1.2 | | |
| 9 | 4 | R2 | 1.2.1 | | |
| 10 | 5 | R2 | 1.2.1.1 | | ZLOTKEY |
| 11 | 4 | R2 | 1.2.2 | | |
| 12 | 5 | R2 | 1.2.2.1 | | KING |

In this case, the descendant index entry associated with the key value "R1.'1.2'" would have a rowid value of 3. The rowid value of 3 points to the third row of the PATH table, which is the row for the node associated with the orderkey 1.2 and the rid R1.

The Descendant Index may be used to improve the performance of many index maintenance queries. For example, the path table entry for /a/c, and for all descendants of /a/c, may be quickly identified by traversing the descendant index based on the index order key 1.1.(25).

Path Subsetting

The Subsetting Application explains how to constrain the set of nodes that are indexed in an XML index. The use of path subsetting affects the hybrid-to-index conversion process because the rank of a canonical component (used in step 108 of FIG. 2) is not necessarily the actual sibling rank of the component in a path-subsetted index. For example, assume that the XML index does not have an entry for node b2 of D1". The exclusion of b2 from the XML index may be accomplished, for example, if the path subsetting criteria indicates "exclude /a/b2". In this case, the XML index would have entries for the following nodes:

| node | index order key |
|------|-----------------|
| root | 1 |
| a | 1.1 |
| b1 | 1.1.1 |
| c | 1.1.(25) |
| b3 | 1.1.3 |

When processing the canonical key 1.1.3 for <c>, the "3" component will eventually be selected as the "current component". Then, at step 106, the XML Index would be used to identify the index order keys of all immediate children of the node associated with current order key 1.1, which is the order key of the node <a>. In the present example, node <a> has four children b1, b2, c and b3. However, the index only has entries for three of the children: b1, c and b3. The index order keys for these children are respectively 1.1.1, 1.1.(25), and 1.1.3.

If the canonical rank of the current component is used without taking into account that the index is path subsetted, then at step 108, the child with a rank equal to 3 is identified. According to the index, node <b3> is the third-ranked child of <a>. Therefore, node <b3>, instead of node <c>, would be identified as the node associated with the canonical order key 1.1.3. Consequently, the canonical key 1.1.3 would be converted into the index order key 1.1.3, instead of 1.1.(25).

To avoid such canonical-to-index order key conversion errors, when the XML index is path subsetted, the current component is converted into a path-subsetted component prior to performing step 108. The difference between a canonical component and its corresponding path-subsetted component is determined by how many sibling nodes that precede that canonical component are excluded from the index. If no sibling nodes that precede that canonical component are excluded from the index, then the path-subsetted component is the same as the canonical component.

If any sibling nodes that precede a canonical component are not indexed, then the path-subsetted component is not the same as the canonical component. Rather, the path-subsetted component is equal to the canonical component minus the number of sibling nodes that (1) precede the component, and (2) have been excluded from the index.

The number of preceding sibling nodes that have been excluded from the XML index may be determined, for example, using a non-deterministic finite automata to perform pattern matching based on the subsetting criteria and the XML document that contains the node in question. The use of a non-deterministic finite automata in the context of path subsetting is described in the Subsetting Application.

In the example given above, b2 is excluded from the index. The last component of the canonical order key of node b2 is 2, which comes before 3. Therefore, the canonical component 3 is reduced by one to produce a path-subsetted component of 2. The path-subsetted component 2 is then used at step 108. Using the path-subsetted component 2 in step 108 will accurately convert canonical key 1.1.3 to index order key 1.1.(25).

Hardware Overview

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-executed method for incrementally maintaining an index that indexes Extensible Markup Language (XML) data, the method comprising:

identifying a node, within the XML data, that is to be deleted in response to a Data Manipulation Language (DML) operation;

generating a hybrid key for the node;

wherein the hybrid key includes (a) a first set of one or more index order key components and (b) a first set of one or more canonical order key components;

wherein the first set of index order key components reflects a portion of an index order key by which the node is indexed in the index;

wherein the first set of canonical order key components reflects the actual position of the node within the XML data;

converting the hybrid key to the index order key;

wherein the index order key includes a second set of one or more index order key components and a third set of one or more index order key components;

wherein the second set of index order key components equals the first set of index order key components;

wherein converting the hybrid key to an index order key comprises converting the first set of canonical order key components to the third set of index order key components;

wherein the first set of canonical order key components differs in value from the third set of index order key components;

using the index order key to locate a set of one or more index entries within the index;

wherein one of the set of one or more index entries indexes the node; and deleting the set of index entries from the index.

2. The method of claim 1 wherein:

the index is a path-subsetted index;

the step of converting the hybrid key to an index order key includes converting canonical components of the hybrid key to path-subsetted components; and using the path-subsetted components to determine the index order key that corresponds to the hybrid key.

3. The method of claim 2 wherein the step of converting canonical components of the hybrid key to path-subsetted components includes determining how many sibling components (a) precede a canonical component, and (b) correspond to nodes that are not included in the index.

4. The method of claim 1 wherein:

the node belongs to an Extensible Markup Language (XML) document that is indexed by said index; and the set of index entries that are deleted from the index does not include index entries for any nodes of the XML document other than the node and any nodes that descend from the node.

5. The method of claim 1 further comprising:

maintaining, as part of the index, a descendant index that is built on index order key values; and traversing the descendant index, based on the index order key, to identify the set of index entries to delete from the index.

6. The method of claim 1 wherein the DML operation is a delete operation.

7. The method of claim 1 wherein generating a hybrid key for the node includes obtaining the first set of one or more index order key components of the hybrid key from the index, and obtaining the first set of one or more canonical order key components without using the index.

8. The method of claim 7 wherein the step of obtaining the second set of one or more canonical order key components includes using streaming evaluation to generate the second set of one or more canonical order key components.

9. The method of claim 7 wherein the step of converting the hybrid key to the index order key includes:
   a) initially establishing a current order key to include the first set of one or more index order key components;
   b) selecting, as a current component, a component of the second set of one or more canonical order key components;
   c) determining all immediate children of the current order key;
   d) ranking the immediate children of the current order key;
   e) identifying the child of the current order key that has a rank equal to the current component;
   f) appending to the current order key a component associated with the child identified in step (e); and
   g) repeating steps (b) to (f) until all components in the second set of canonical order key components have been selected as the current component.

10. The method of claim 9 further comprising using a descendant index to determine all immediate children of the current order key.

11. The method of claim 1 wherein:
   the node belongs to an Extensible Markup Language (XML) document;
   the XML document is encoded in binary XML format; and
   the DML operation is performed on the XML data using a piece-wise operation that does not cause the XML document to be entirely rewritten.

12. A machine-executed method for incrementally maintaining an index that indexes Extensible Markup Language (XML) data, the method comprising:
   identifying a particular node that is to be added to the XML data in response to a Data Manipulation Language (DML) operation;
   generating a hybrid key for a parent node of the particular node;
   wherein the hybrid key includes (a) a first set of one or more index order key components and (b) a first set of one or more canonical order key components;
   wherein the first set of index order key components reflects a portion of an index order key by which the parent node is indexed in the index;
   wherein the first set of canonical order key components reflects the actual position of the parent node within the XML data;
   converting the hybrid key to a first index order key;
   wherein the index order key includes a second set of one or more index order key components and a third set of one or more index order key components;
   wherein the second set of index order key components equals the first set of index order key components;
   wherein converting the hybrid key to the first index order key comprises converting the first set of canonical order key components to the third set of index order key components;
   wherein the first set of canonical order key components differs in value from the third set of index order key components;
   adding a component to the first index order key to generate a second index order key for the particular node; and
   storing, within the index, an index entry for the particular node;
   wherein the index entry includes the second index order key.

13. The method of claim 12 wherein further comprising generating the component to add to the first index order key by:
   identifying a last child node of the parent node;
   identifying a last component of an index order key of the last child node; and
   generating a value, to be used as said component, that is greater than the last component of the index order key of the last child node.

14. The method of claim 12 wherein further comprising generating the component to add to the first index order key by:
   identifying two sibling nodes between which the particular node is to logically reside;
   identifying last components of index order keys of the two sibling nodes; and
   generating a value, to be used as said component, that is between the last components of the index order keys of the two sibling nodes.

15. The method of claim 12 wherein:
   the index is a path-subsetted index;
   the step of converting the hybrid key to an index order key includes converting canonical components of the hybrid key to path-subsetted components; and
   using the path-subsetted components to determine the index order key that corresponds to the hybrid key.

16. The method of claim 15 wherein the step of converting canonical components of the hybrid key to path-subsetted components includes determining how many sibling components (a) precede a canonical component, and (b) correspond to nodes that are not included in the index.

17. The method of claim 12 wherein generating a hybrid key for the node includes obtaining a first set of one or more components of the hybrid key from the index, and obtaining a second set of one or more canonical components without using the index.

18. The method of claim 17 wherein the step of obtaining the second set of one or more canonical components includes using streaming evaluation to generate the second set of one or more canonical components.

19. The method of claim 17 wherein the step of converting the hybrid key to the first index order key includes:
   a) initially establishing a current order key to include the first set of one or more components;
   b) selecting, as a current component, a component of the second set of one or more components;
   c) determining all immediate children of the current order key;
   d) ranking the immediate children of the current order key;
   e) identifying the child of the current order key that has a rank equal to the current component;
   f) appending to the current order key a component associated with the child identified in step (e); and
   g) repeating steps (b) to (f) until all components in the second set of components have been selected as the current component.

20. The method of claim 19 further comprising using a descendant index to determine all immediate children of the current order key.

21. The method of claim 12 wherein:
   the node belongs to an XML document;
   the XML document is encoded in binary XML format; and the DML operation is performed on the XML data using a piece-wise operation that does not cause the XML document to be entirely rewritten.

22. A computer-readable volatile or non-volatile storage medium storing computer-executable instructions for:
    identifying a node, within the XML data, that is to be deleted in response to a Data Manipulation Language (DML) operation;
    generating a hybrid key for the node;
    wherein the hybrid key includes (a) a first set of one or more index order key components and (b) a first set of one or more canonical order key components;
    wherein the first set of index order key components reflects a portion of an index order key by which the node is indexed in the index;
    wherein the first set of canonical order key components reflects the actual position of the node within the XML data;
    converting the hybrid key to the index order key;
    wherein the index order key includes a second set of one or more index order key components and a third set of one or more index order key components;
    wherein the second set of index order key components equals the first set of index order key components;
    wherein converting the hybrid key to an index order key comprises converting the first set of canonical order key components to the third set of index order key components;
    wherein the first set of canonical order key components differs in value from the third set of index order key components;
    using the index order key to locate a set of one or more index entries within the index;
    wherein one of the set of one or more index entries indexes the node; and
    deleting the set of index entries from the index.

23. The computer-readable volatile or non-volatile storage medium of claim 22, wherein the index is a path-subsetted index, and wherein the instructions for converting the hybrid key to an index order key include instructions for:
    converting canonical components of the hybrid key to path-subsetted components; and
    using the path-subsetted components to determine the index order key that corresponds to the hybrid key.

24. The computer-readable volatile or non-volatile storage medium of claim 23, wherein the instructions for converting canonical components of the hybrid key to path-subsetted components include instructions for determining how many sibling components (a) precede a canonical component, and (b) correspond to nodes that are not included in the index.

25. The computer-readable volatile or non-volatile storage medium of claim 22, wherein:
    the node belongs to an Extensible Markup Language (XML) document that is indexed by said index; and
    the set of index entries that are deleted from the index does not include index entries for any nodes of the XML document other than the node and any nodes that descend from the node.

26. The computer-readable volatile or non-volatile storage medium of claim 22, further comprising instructions for:
    maintaining, as part of the index, a descendant index that is built on index order key values; and
    traversing the descendant index, based on the index order key, to identify the set of index entries to delete from the index.

27. The computer-readable volatile or non-volatile storage medium of claim 22, wherein the DML operation is a delete operation.

28. The computer-readable volatile or non-volatile storage medium of claim 22, wherein the instructions for generating a hybrid key for the node include instructions for:
    obtaining the first set of one or more index order key components of the hybrid key from the index, and
    obtaining the first set of one or more canonical order key components without using the index.

29. The computer-readable volatile or non-volatile storage medium of claim 28, wherein the instructions for obtaining the second set of one or more canonical order key components include instructions for using streaming evaluation to generate the second set of one or more canonical order key components.

30. The computer-readable volatile or non-volatile storage medium of claim 28, wherein the instructions for converting the hybrid key to the index order key include instructions for:
    a) initially establishing a current order key to include the first set of one or more index order key components;
    b) selecting, as a current component, a component of the second set of one or more canonical order key components;
    c) determining all immediate children of the current order key;
    d) ranking the immediate children of the current order key;
    e) identifying the child of the current order key that has a rank equal to the current component;
    f) appending to the current order key a component associated with the child identified in (e); and
    g) repeating (b) to (f) until all components in the second set of canonical order key components have been selected as the current component.

31. The computer-readable volatile or non-volatile storage medium of claim 30, further comprising instructions for using a descendant index to determine all immediate children of the current order key.

32. The computer-readable volatile or non-volatile storage medium of claim 22, wherein:
    the node belongs to an Extensible Markup Language (XML) document;
    the XML document is encoded in binary XML format; and
    the DML operation is performed on the XML data using a piece-wise operation that does not cause the XML document to be entirely rewritten.

33. A computer-readable volatile or non-volatile storage medium storing computer-executable instructions for:
    identifying a particular node that is to be added to the XML data in response to a Data Manipulation Language (DML) operation;
    generating a hybrid key for a parent node of the particular node;
    wherein the hybrid key includes (a) a first set of one or more index order key components and (b) a first set of one or more canonical order key components;
    wherein the first set of index order key components reflects a portion of an index order key by which the parent node is indexed in the index;
    wherein the first set of canonical order key components reflects the actual position of the parent node within the XML data;
    converting the hybrid key to a first index order key;
    wherein the index order key includes a second set of one or more index order key components and a third set of one or more index order key components;

wherein the second set of index order key components equals the first set of index order key components;

wherein converting the hybrid key to the first index order key comprises converting the first set of canonical order key components to the third set of index order key components;

wherein the first set of canonical order key components differs in value from the third set of index order key components;

adding a component to the first index order key to generate a second index order key for the particular node; and storing, within the index, an index entry for the particular node;

wherein the index entry includes the second index order key.

34. The computer-readable volatile or non-volatile storage medium of claim 33, wherein the instructions include instructions for generating the component to add to the first index order key by:
 identifying a last child node of the parent node;
 identifying a last component of an index order key of the last child node; and
 generating a value, to be used as said component, that is greater than the last component of the index order key of the last child node.

35. The computer-readable volatile or non-volatile storage medium of claim 33, wherein the instructions include instructions for generating the component to add to the first index order key by:
 identifying two sibling nodes between which the particular node is to logically reside;
 identifying last components of index order keys of the two sibling nodes; and
 generating a value, to be used as said component, that is between the last components of the index order keys of the two sibling nodes.

36. The computer-readable volatile or non-volatile storage medium of claim 33, wherein the index is a path-subsetted index, and wherein the instructions for converting the hybrid key to an index order key include instructions for:
 converting canonical components of the hybrid key to path-subsetted components; and
 using the path-subsetted components to determine the index order key that corresponds to the hybrid key.

37. The computer-readable volatile or non-volatile storage medium of claim 33, wherein the instructions for converting canonical components of the hybrid key to path-subsetted components include instructions for determining how many sibling components (a) precede a canonical component, and (b) correspond to nodes that are not included in the index.

38. The computer-readable volatile or non-volatile storage medium of claim 33, wherein the instructions for generating a hybrid key for the node include instructions for:
 obtaining a first set of one or more components of the hybrid key from the index, and obtaining a second set of one or more canonical components without using the index.

39. The computer-readable volatile or non-volatile storage medium of claim 38, wherein the instructions for obtaining the second set of one or more canonical components include instructions for using streaming evaluation to generate the second set of one or more canonical components.

40. The computer-readable volatile or non-volatile storage medium of claim 38, wherein the instructions for converting the hybrid key to the first index order key include instructions for:
 a) initially establishing a current order key to include the first set of one or more components;
 b) selecting, as a current component, a component of the second set of one or more components;
 c) determining all immediate children of the current order key;
 d) ranking the immediate children of the current order key;
 e) identifying the child of the current order key that has a rank equal to the current component;
 f) appending to the current order key a component associated with the child identified in (e); and
 g) repeating (b) to (f) until all components in the second set of components have been selected as the current component.

41. The computer-readable volatile or non-volatile storage medium of claim 40, further comprising instructions for using a descendant index to determine all immediate children of the current order key.

42. The computer-readable volatile or non-volatile storage medium of claim 33, wherein:
 the node belongs to an XML document;
 the XML document is encoded in binary XML format; and
 the DML operation is performed on the XML data using a piece-wise operation that does not cause the XML document to be entirely rewritten.

* * * * *

UNITED STATES PATENT AND TRADEMARK OFFICE
CERTIFICATE OF CORRECTION

PATENT NO.         : 7,739,251 B2
APPLICATION NO.    : 11/715603
DATED              : June 15, 2010
INVENTOR(S)        : Nitin Gupta et al.

Page 1 of 1

It is certified that error appears in the above-identified patent and that said Letters Patent is hereby corrected as shown below:

On Title page 2, Item (56), in column 2, under "Other Publications", line 34, delete "Pulished" and insert -- Published --, therefor.

In column 1, line 62, before "associated" insert -- that are --.

In column 2, line 5, delete "key" and insert -- Key --, therefor.

In column 3, line 2, delete "where" and insert -- were --, therefor.

In column 4, line 20, before "DESCRIPTION" insert -- BRIEF --.

In column 6, line 54, delete "Illustration," and insert -- illustration, --, therefor.

In column 8, line 9, after "108" insert -- . --.

In column 10, line 21, delete "transversed" and insert -- traversed --, therefor.

In column 10, line 22, delete "able" and insert -- PATH table --, therefor.

Signed and Sealed this
Twelfth Day of July, 2011

David J. Kappos
*Director of the United States Patent and Trademark Office*